United States Patent [19]
McCulley et al.

[11] Patent Number: 5,924,235
[45] Date of Patent: Jul. 20, 1999

[54] FISHING ROD LOCK SYSTEM

[76] Inventors: Andy R. McCulley, 6371 Estrelle Ave., Mt. Morris, Mich. 48458; Richard James Laurin; Robert Laurin, both of 5196 E. Willard Rd, Clio, Mich. 48420

[21] Appl. No.: 09/094,866

[22] Filed: Jun. 15, 1998

[51] Int. Cl.$^6$ .............................. A01K 87/00; B25G 3/00
[52] U.S. Cl. .......................... 43/18.1; 43/18.5; 403/334
[58] Field of Search ..................... 43/18.1, 18.5; 403/343, 334, 267, 265

[56] References Cited

U.S. PATENT DOCUMENTS

| | | | |
|---|---|---|---|
| 1,441,045 | 1/1923 | Tredwell | 43/18.1 |
| 1,565,069 | 12/1925 | Edwards | 403/265 |
| 1,599,270 | 9/1926 | Axelson | 403/267 |
| 1,932,427 | 10/1933 | Stone | 403/267 |
| 2,154,812 | 4/1939 | Hauser | 403/267 |
| 2,443,946 | 6/1948 | Bozorth, Jr. | 43/25 |
| 2,536,388 | 1/1951 | Murray | 43/18.1 |
| 2,600,629 | 6/1952 | Feierabend | 43/18.1 |
| 3,152,820 | 10/1964 | Giampa | 43/18.1 |
| 3,173,713 | 3/1965 | Yasui | 43/18.5 |
| 3,462,147 | 8/1969 | Mancuso | 403/265 |
| 3,475,719 | 10/1969 | Laig | 339/75 |
| 3,519,294 | 7/1970 | Barnes | 403/267 |
| 3,797,865 | 3/1974 | Ballentine | 285/175 |
| 3,910,525 | 10/1975 | Frank | 403/343 |
| 4,708,038 | 11/1987 | Hellnick et al. | 82/1 C |
| 4,730,857 | 3/1988 | Schwind | 285/390 |
| 5,104,335 | 4/1992 | Conley et al. | 439/369 |
| 5,160,257 | 11/1992 | Tsengas | 43/25 |
| 5,226,198 | 7/1993 | Martin | 15/230.11 |
| 5,411,347 | 5/1995 | Bowmer et al. | 403/305 |
| 5,522,169 | 6/1996 | Heller | 43/23 |
| 5,535,539 | 7/1996 | Vetre | 43/23 |
| 5,588,244 | 12/1996 | Akiba et al. | 43/24 |

FOREIGN PATENT DOCUMENTS

| | | | |
|---|---|---|---|
| 858186 | 12/1970 | Canada | 43/18.5 |
| 361250 | 9/1989 | European Pat. Off. | 403/265 |
| 594236 | 10/1993 | European Pat. Off. | 403/267 |
| 1103640 | 11/1955 | France | 43/18.1 |
| 1070934 | 4/1986 | Japan | 43/18.1 |
| 1224921 | 10/1986 | Japan | 43/18.1 |
| 1148 | 1/1894 | United Kingdom | 43/18.1 |
| 2216373 | 10/1989 | United Kingdom | 43/18.1 |

OTHER PUBLICATIONS

Popular Science, "We Make Our Own Glass Fishing Rods", Phil McCafferty, vol. 168, #3, Mar. 1955.

*Primary Examiner*—Thomas Price
*Assistant Examiner*—Fredrick T. French, III

[57] ABSTRACT

The present invention comprises a fishing rod lock system. The system includes a generally cylindrical male insert. The male insert has a cylindrical exterior extent with a central cylindrical bore for receiving the inboard end of the upper fishing rod section. The male insert further includes an inboard extent formed with threads, the threads being shallower and finer adjacent to the outboard end. The system also includes a generally cylindrical female insert. The female insert has a central cylindrical bore at the outboard end for receiving the inboard end of the male insert. The female insert further includes a cylindrical recess at its inboard end for receiving the outboard end of the lower fishing rod section. The female insert also has an intermediate cylindrical section with threads, the threads being shallower and finer adjacent to the outboard end.

3 Claims, 2 Drawing Sheets

FISHING ROD LOCK SYSTEM

BACKGROUND OF THE INVENTION

1. Field of the Invention

The present invention relates to a new and improved fishing rod lock system and, more particularly, pertains to securely coupling fishing rod sections.

2. Description of the Prior Art

The use of separable fishing rods of known designs and configurations is known in the prior art. More specifically, separable fishing rods of known designs and configurations heretofore devised and utilized for the purpose of coupling sections of fishing rods through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for securely coupling fishing rod sections. By way of example, U.S. Pat. No. 2,443,946 to Bozorth, Jr., issued Jun. 22, 1948; U.S. Pat. No. 3,475,716 to Laig, issued Oct. 28, 1969; U.S. Pat. No. 5,104,335 to Conley et al., issued Apr. 14, 1992; U.S. Pat. No. 5,160,257 to Tsengas, issued Nov. 3, 1992; and U.S. Pat. No. 5,336,107 to Sheryll, issued Aug. 9, 1994. Foreign patents of interest include: EP 0 361 250 A2 to Langer geb. Layher et al., issue/priority date of Sep. 16, 1989 and EP 0 594 236 A1 to Allard et al., issue/priority date of Oct. 4, 1993.

In this respect, the fishing rod lock system according to the present invention substantially departs from the conventional concepts and designs of the prior art, and in doing so provides an apparatus primarily developed for the purpose of securely coupling fishing rod sections.

Therefore, it can be appreciated that there exists a continuing need for a new and improved fishing rod lock system which can be used for securely coupling fishing rod sections. In this regard, the present invention substantially fulfills this need.

SUMMARY OF THE INVENTION

In view of the foregoing disadvantages inherent in the known types of separable fishing rods of known designs and configurations now present in the prior art, the present invention provides an improved fishing rod lock system. As such, the general purpose of the present invention, which will be described subsequently in greater detail, is to provide a new and improved fishing rod lock system and methods which have all the advantages of the prior art and none of the disadvantages.

To attain this, the present invention essentially comprises a new and improved fishing rod lock system comprising, in combination, an upper fishing rod section having an outboard end 16 and an inboard end of a generally cylindrical configuration; a lower fishing rod section having an outboard end 24 and an inboard end; a generally cylindrical male insert having a cylindrical exterior extent with a central cylindrical bore for receiving the inboard end of the upper fishing rod section and an inboard extent formed with threads, the threads being shallower and finer adjacent to the outboard end and gradually increasing in depth and spacing for forming deep and widely spaced ends adjacent to the inboard end; a generally cylindrical female insert having a central cylindrical bore at the outboard end for receiving the inboard end of the male insert, the female insert having a cylindrical recess at its inboard end for receiving the outboard end of the lower fishing rod section, the female insert having an intermediate cylindrical section with threads, the threads being shallower and finer adjacent to the outboard end and gradually increasing in depth and spacing to form deeper and wider threads adjacent to the inboard end, the threaded portion of the female section adapted to receive the threaded section of the male insert; and a permanent adhesive coupling the inboard end of the upper fishing rod section to the outboard end of the male insert and to couple the outboard end of the lower fishing rod section to the inboard end of the female section.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod lock system which has all the advantages of the prior art separable fishing rods of known designs and configurations and none of the disadvantages.

It is another object of the present invention to provide a new and improved fishing rod lock system which may be easily and efficiently manufactured and marketed.

It is a further object of the present invention to provide a new and improved fishing rod lock system which is of a durable and reliable construction.

An even further object of the present invention is to provide a new and improved fishing rod lock system which is susceptible of a low cost of manufacture with regard to both materials and labor, and which accordingly is then susceptible of low prices of sale to the consuming public, thereby making such separable fishing rods of known designs and configurations economically available to the buying public.

Still yet another object of the present invention is to provide a new and improved fishing rod lock system which provides in the apparatuses and methods of the prior art some of the advantages thereof, while simultaneously overcoming some of the disadvantages normally associated therewith.

Even still another object of the present invention is to securely couple fishing rod sections.

Lastly, it is an object of the present invention to provide a fishing rod lock system. The system includes a generally cylindrical male insert. The male insert has a cylindrical exterior extent with a central cylindrical bore for receiving the inboard end of the upper fishing rod section. The male insert further includes an inboard extent formed with threads, the threads being shallower and finer adjacent to the outboard end. The system also includes a generally cylindrical female insert. The female insert has a central cylindrical bore at the outboard end for receiving the inboard end of the male insert. The female insert further includes a cylindrical recess at its inboard end for receiving the outboard end of the lower fishing rod section. The female insert also has an intermediate cylindrical section with threads, the threads being shallower and finer adjacent to the outboard end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
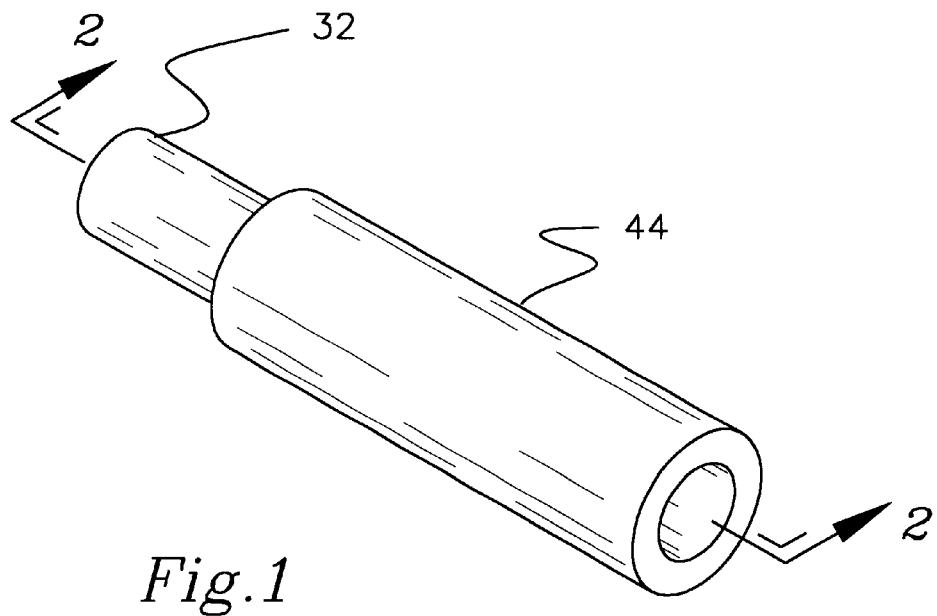
FIG. 1 is a perspective illustration of the male and female inserts when coupled.
Figure 2:
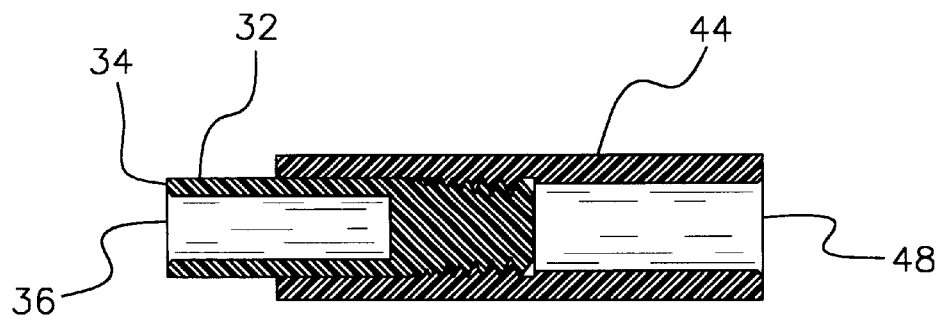
FIG. 2 is a cross-sectional view taken along line 2—2 of FIG. 1.
Figure 3:
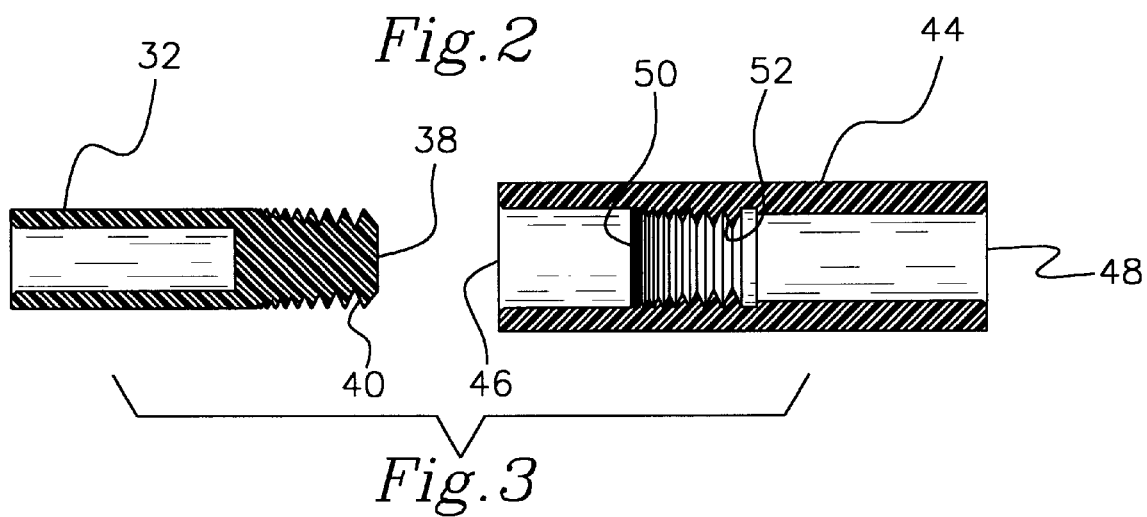
FIG. 3 is a cross-sectional view similar to FIG. 2 but showing the inserts in a separated orientation.
Figure 4:
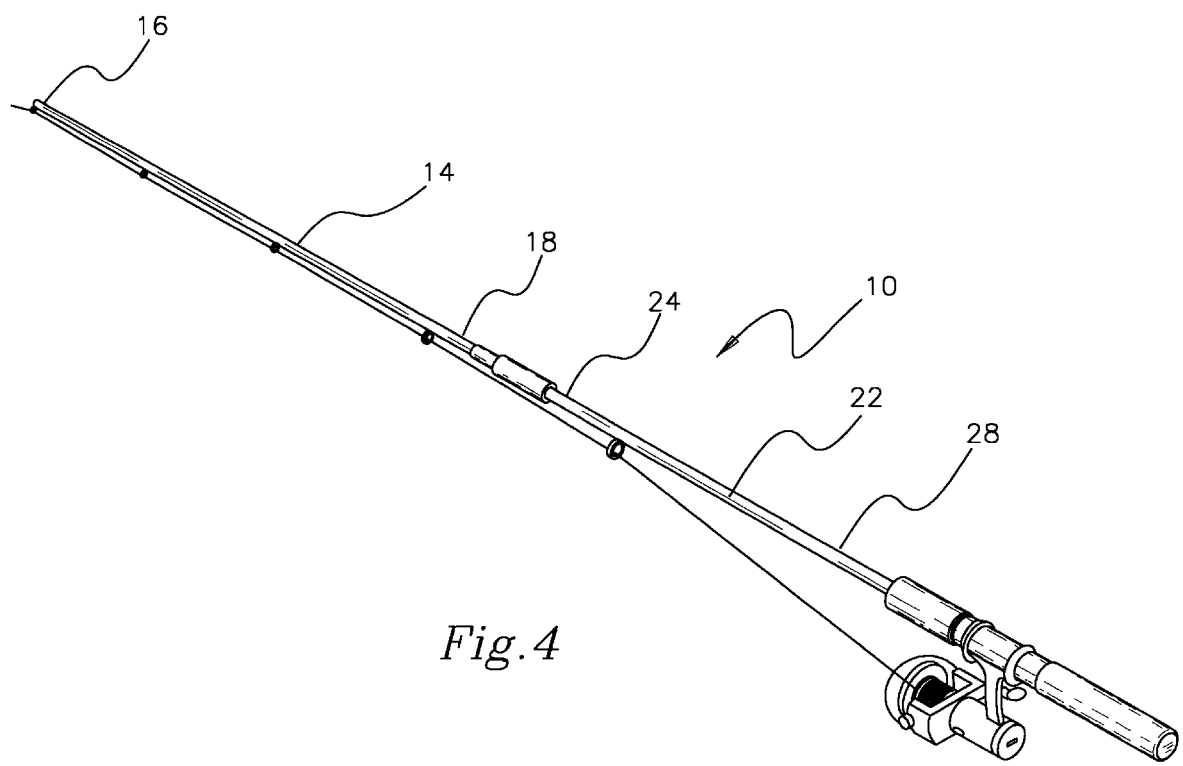
FIG. 4 is a perspective view of a fishing rod employing the male and female inserts of the prior Figures.

With reference now to the drawings, and in particular to FIG. 1 thereof, the preferred embodiment of the new and improved fishing rod lock system embodying the principles and concepts of the present invention and generally designated by the reference numeral 10 will be described.

The present invention, the new and improved fishing rod lock system is a system 10 comprised of a plurality of components. In their broadest context, the components include an upper fishing rod section, a lower fishing rod section, a male insert, a female insert, and adhesive. Each of the individual components is specifically configured and correlated one with respect to the other so as to attain the desired objectives.

More specifically, the system 10 of the present invention includes an upper fishing rod section 14. The upper fishing rod section has an outboard end 16. It is also provided with an inboard end 18 of a generally cylindrical configuration.

Next provided is a lower fishing rod section 22. The lower fishing rod section has an outboard end 24 and an inboard end 28.

Also provided is a generally cylindrical male insert 32. The male insert has a cylindrical exterior extent 34 with a central cylindrical bore 36. The bore is configured for receiving the inboard end of the upper fishing rod section. The bore is also configured with an inboard extent 38 formed with threads. The threads are shallower and finer adjacent to the outboard end and gradually increase in depth and spacing for forming deep and widely spaced ends 40 adjacent to the inboard end.

Next provided is a generally cylindrical female insert 44. The female insert has a central cylindrical bore 46 at the outboard end for receiving the inboard end of the male insert. The female insert also has a cylindrical recess 48 at its inboard end for receiving the outboard end of the lower fishing rod section. The female insert further contains an intermediate cylindrical section 50 with threads. These threads are shallower and finer adjacent to the outboard end and gradually increase in depth and spacing to form deeper and wider threads 52 adjacent to the inboard end. The threaded portion of the female section is thus adapted to receive the threaded section of the male insert.

Lastly provided is a permanent adhesive coupling the inboard end of the upper fishing rod section to the outboard end of the male insert. The adhesive further couples the outboard end of the lower fishing rod section to the inboard end of the female section.

The present invention is a lock for a two or more piece fishing rod. When fishing, the act of casting the line will sometimes result in a two piece fishing rod coming apart and the top of the rod being tossed into the water. The fishing rod lock system would solve this problem by securely locking the two pieces of the fishing rod together. It also protects the pole from breaking.

The present invention consists of two pieces of plastic which are attached to the ends of the two piece fishing rod. One of the pieces is the female part of the lock and the other is the male part. Both of the pieces have a C-shaped body which wraps around the shaft of the fishing rod. The inside of this body is coated with a permanent adhesive which connects it to the fishing rod. When the rod is assembled, the female lock is brought down to snap over the male part of the lock. When taking the rod apart, the female part of the lock is snapped up and off to separate the pieces of the rod.

The present invention includes many advantages. It is easy to install and stays permanently. The twist lock is easy for anyone to use. A thumb release could be added to the invention for easy release. The streamlined design of the present invention does not interfere with the eyes of the rod during casting. Various sizes can be made to fit all fishing rod diameters. Lastly, the present invention protects against the loss and damage of expensive two piece fishing rods.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod lock system comprising, in combination:

an upper fishing rod section having an outboard end and an inboard end of a generally cylindrical configuration;

a lower fishing rod section having an outboard end and an inboard end;

a generally cylindrical male insert having a cylindrical exterior extent with a central cylindrical bore for receiving the inboard end of the upper fishing rod section and an inboard extent formed with threads, the threads being shallower and finer adjacent to the outboard end and gradually increasing in depth and spacing for forming deep and widely spaced ends adjacent to the inboard end;

a generally cylindrical female insert having a central cylindrical bore at the outboard end for receiving the inboard end of the male insert, the female insert having a cylindrical recess at its inboard end for receiving the outboard end of the lower fishing rod section, the female insert having an intermediate cylindrical section with threads, the threads being shallower and finer adjacent to the outboard end and gradually increasing in depth and spacing to form deeper and wider threads adjacent to the inboard end, the threaded portion of the female insert adapted to receive the threaded section of the male insert; and a permanent adhesive coupling the inboard end of the upper fishing rod section to the outboard end of the male insert and to couple the outboard end of the lower fishing rod section to the inboard end of the female section.

2. A fishing rod lock system comprising:

a generally cylindrical male insert having a cylindrical exterior extent with a central cylindrical bore for receiving an inboard end of an upper fishing rod section and an inboard extent formed with threads, the threads being shallower and finer adjacent to the outboard end; and a generally cylindrical female insert having a central cylindrical bore at the outboard end for receiving the inboard end of the male insert, the female insert having a cylindrical recess at its inboard end for receiving an outboard end of a lower fishing rod section, the female insert having an intermediate cylindrical section with threads, the threads being shallower and finer adjacent to the outboard end; and the threaded portion of the female insert adapted to receive the threaded section of the male insert.

3. The system as set forth in claim 2 and further including a permanent adhesive coupling the inboard end of the upper fishing rod section to the outboard end of the male insert and to couple the outboard end of the lower fishing rod section to the inboard end of the female section.

* * * * *